US012273406B2

(12) United States Patent
Carofiglio et al.

(10) Patent No.: US 12,273,406 B2
(45) Date of Patent: *Apr. 8, 2025

(54) USER-DEFINED QUALITY OF EXPERIENCE (QOE) PRIORITIZATIONS

(71) Applicant: Cisco Technology, Inc., San Jose, CA (US)

(72) Inventors: Giovanna Carofiglio, Paris (FR); Giulio Grassi, Paris (FR); Enrico Loparco, Boulogne-Billancourt (FR); Michele Papalini, Issy les Moulineaux (FR); Jacques Samain, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/871,556

(22) Filed: Jul. 22, 2022

(65) Prior Publication Data

US 2022/0360618 A1    Nov. 10, 2022

Related U.S. Application Data

(63) Continuation of application No. 17/316,328, filed on May 10, 2021, now Pat. No. 11,431,781.

(51) Int. Cl.
*H04L 65/80* (2022.01)
*H04L 65/65* (2022.01)
(Continued)

(52) U.S. Cl.
CPC .............. *H04L 65/80* (2013.01); *H04L 65/65* (2022.05); *H04L 65/762* (2022.05); *H04N 21/44213* (2013.01)

(58) Field of Classification Search
CPC ..... H04L 65/80; H04L 65/602; H04L 65/608; H04N 21/44213
See application file for complete search history.

(56) References Cited

U.S. PATENT DOCUMENTS 8,862,659 B2   10/2014   Blanchard et al.
10,230,679 B1   3/2019   Kielhofner et al.
(Continued)

OTHER PUBLICATIONS

Ammar et al., "Quality of Experience-Assessment of WebRTC Based Video Communication," European Research Consortium for Informatics and Mathematics, Apr. 4, 2016, 3 pages.
(Continued)

*Primary Examiner* — Michael A Keller
(74) *Attorney, Agent, or Firm* — Lee & Hayes, P.C.

(57) ABSTRACT

A method includes, at a media bridge configured to distribute a plurality of media streams among a plurality of client devices connected to the media bridge over a network during a real-time communication (RTC) instance, receiving a plurality of quality of experience (QoE) preferences from the plurality of client devices via the media bridge, the plurality of QoE preferences being transmitted as a real-time transport protocol (RTP) control protocol (RTCP) extension header of a transmitted data packet. The method also includes receiving a plurality of QoE metrics at the media bridge, and in response to a determination that a degradation in network conditions of the network has occurred, downgrading at least one of the plurality of media streams based on the plurality of QoE preferences.

20 Claims, 7 Drawing Sheets

(51) Int. Cl.
*H04L 65/75* (2022.01)
*H04N 21/442* (2011.01)

(56) References Cited

U.S. PATENT DOCUMENTS

| | | |
|---|---|---|
| 10,455,194 B1 | 10/2019 | Yang et al. |
| 2001/0052012 A1 | 12/2001 | Rinne et al. |
| 2005/0232284 A1 | 10/2005 | Karaoguz et al. |
| 2013/0107741 A1* | 5/2013 | Huang .................. H04L 43/00 370/252 |
| 2013/0159498 A1 | 6/2013 | Funge et al. |
| 2013/0208663 A1 | 8/2013 | Kanniappan et al. |
| 2013/0265446 A1 | 10/2013 | Nicas et al. |
| 2014/0016464 A1 | 1/2014 | Shirazipour et al. |
| 2014/0132703 A1 | 5/2014 | Li et al. |
| 2014/0201329 A1 | 7/2014 | Himayat et al. |
| 2015/0200974 A1* | 7/2015 | Pearce ................ H04L 65/1069 709/203 |
| 2019/0132219 A1 | 5/2019 | Gandhi |
| 2019/0222491 A1 | 7/2019 | Tomkins et al. |

OTHER PUBLICATIONS

Office Action for U.S. Appl. No. 17/316,328, mailed on Sep. 20, 2021, Carofiglio, "User-Defined Quality of Experience (QOE) Prioritizations", 14 Pages.

Office Action for U.S. Appl. No. 17/316,328, mailed Mar. 24, 2022, Carofiglio, "User-Defined Quality of Experience (QOE) Prioritization", 11 pages.

Office Action for U.S. Appl. No. 17/316,328, mailed on May 5, 2022, Carofiglio, "User-Defined Quality of Experience (QOE) Prioritizations", 11 pages.

Vucic et al., "QOE Evaluation of WebRTC-Based Mobile Multiparty Video Calls in Light of Different Video Codec Settings," EEEE. org, published Jul. 3-5, 2019, 8 pages.

* cited by examiner

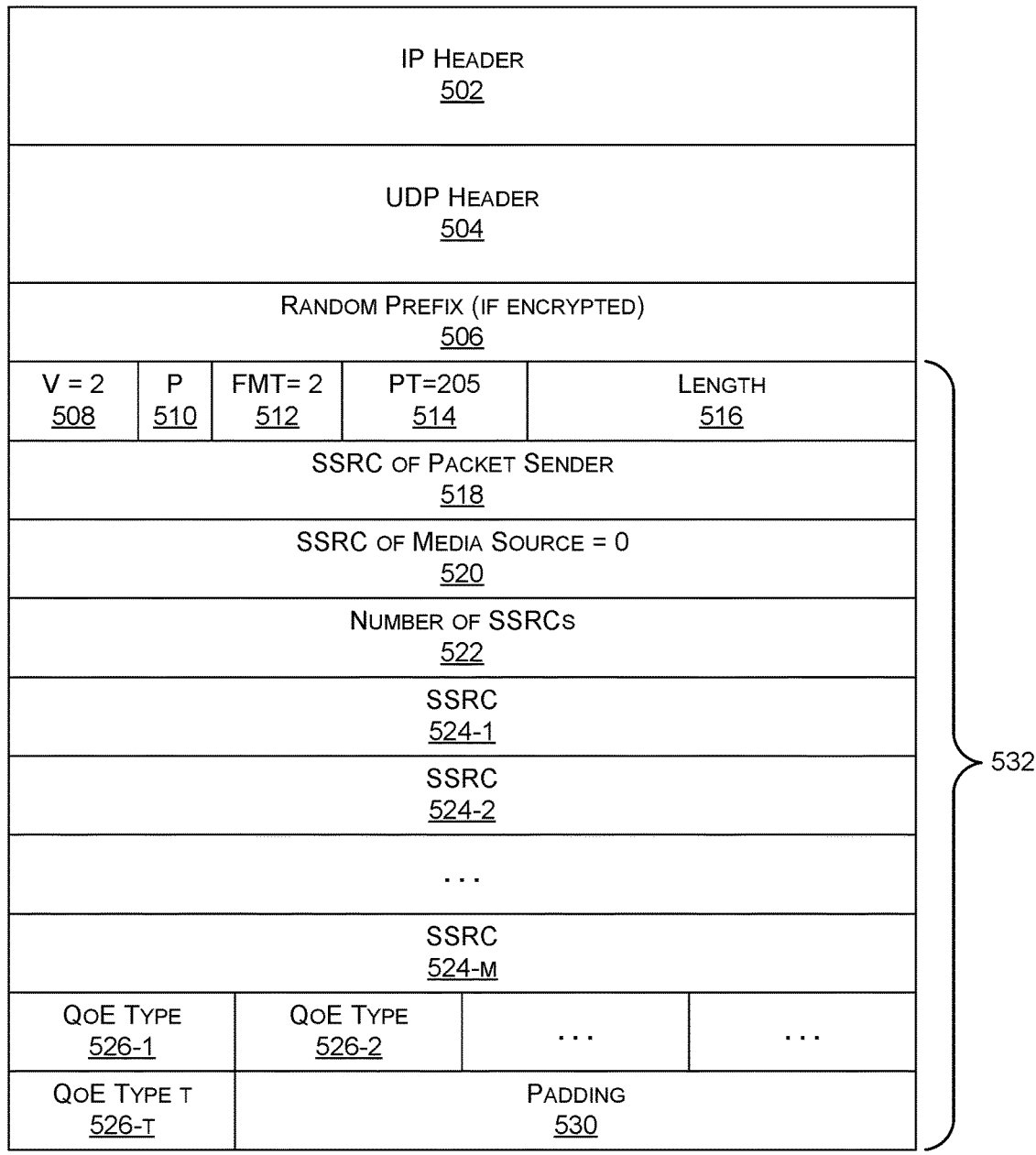
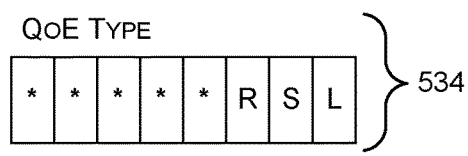
FIG. 5

USER-DEFINED QUALITY OF EXPERIENCE (QOE) PRIORITIZATIONS

RELATED APPLICATIONS

This application claims priority to and is a continuation of U.S. patent application Ser. No. 17/316,328, filed on May 10, 2021, the entire contents of which are incorporated herein by reference.

TECHNICAL FIELD

The present disclosure relates generally to real-time communications (RTC). Specifically, the present disclosure relates to systems and methods for obtaining user-defined quality of experience (QoE) customization and prioritization metrics for dynamic application within an RTC instance.

BACKGROUND

Real-time communications (RTC) such as, for example, Web Real-Time Communications (WebRTC), includes any type of communications systems and methods including associated software protocols and communication hardware media that provides real-time guarantees of real-time computing communications. Thus, RTC including WebRTC provides ultra-low-latency media streaming and emerges as a promising option when compared to other communication schemas such as, for example, HyperText Transfer Protocol (HTTP) live streaming technologies including HTTP Live Streaming (HLS) or the Moving Picture Experts Group (MPEG) Dynamic Adaptive Streaming over HTTP (MPEG/DASH), which fail to go below the few second timescale imposed by the chunk granularity.

RTC systems may leverage internal definition and optimization of application-layer metrics reflecting user quality of experience (QoE). These metrics may be referred to as objective QoE parameters as they provide an objective measure of user satisfaction. The objective QoE metric may include, for example, bitrate (e.g, resolution), frames per second (e.g., smoothness), loss recovery and concealment (e.g., reliability), loss, jitter, and latency information, among other QoE metrics. These QoE metrics may be applied to a single media stream (e.g., audio and/or video content sharing stream) or, depending on a configuration of the RTC system, to an active speaker associated with the media stream sharing. The optimization of the QoE metrics may be subject to application-layer media and transport control mechanisms such as, for example, simulcast and rate adaptation, recovery mechanisms based on retransmissions or forward error correction (FEC) (e.g., encoding messages in a redundant manner for controlling errors in data transmissions over unreliable or noisy communication channels), loss concealment, frames per seconds adaptations and/or selections. Further, the optimization of the QoE metrics may be out of the control of the user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a real-time transport protocol (RTP) control protocol (RTCP) packet including an RTCP extension header and a transport layer feedback message, according to an example of the principles described herein.

DESCRIPTION OF EXAMPLE EMBODIMENTS

Figure 1:
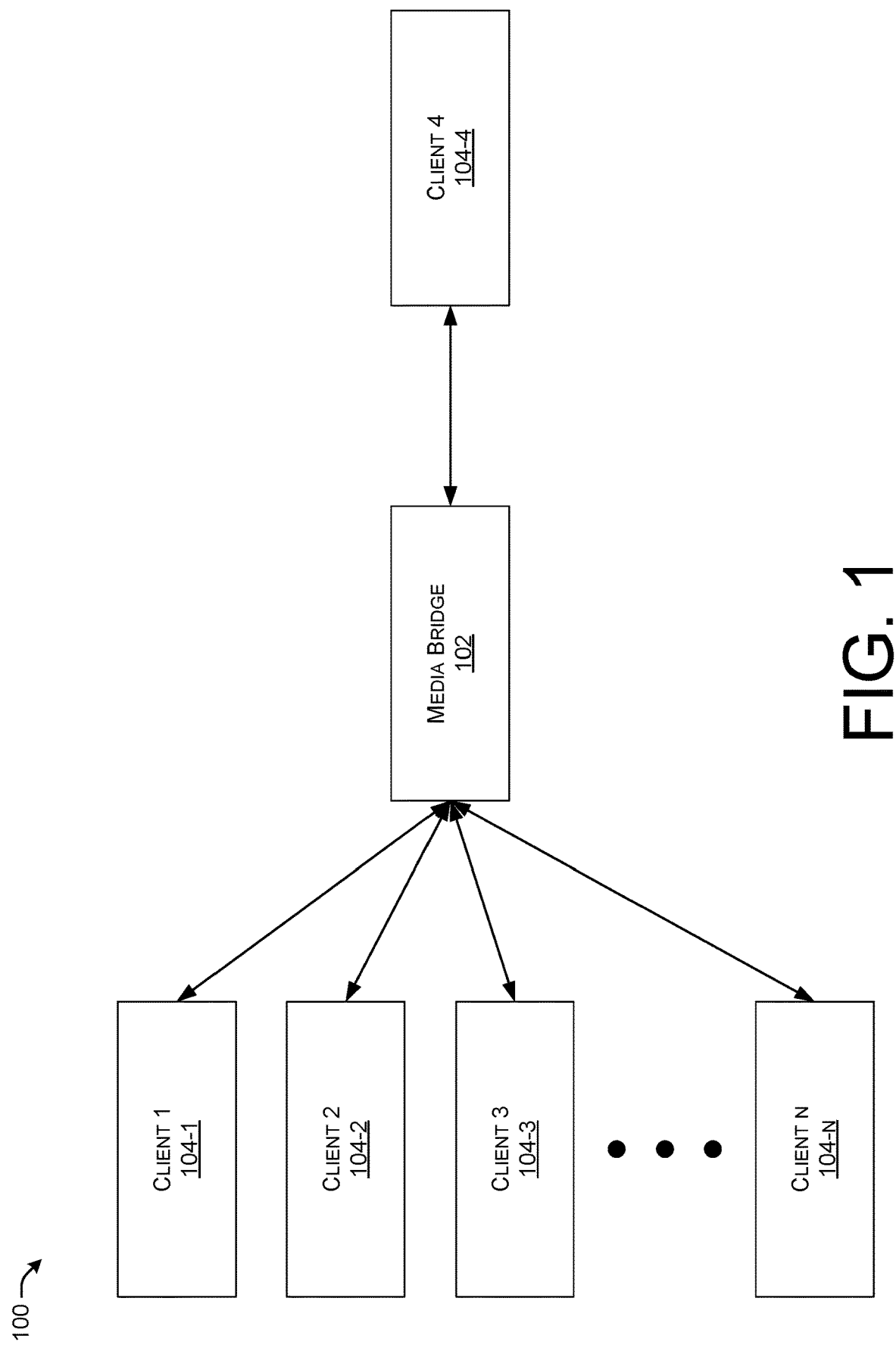
FIG. 1 illustrates a system-architecture diagram of a real-time communication (RTC) system, according to an example of the principles described herein.

The present systems and methods provide for the collection and consideration of user-input in the definition and optimization of objective QoE metrics in order to improve the QoE of the user. As described above, decisions enforced by a rate adaptation and transport logic of a managing device such as a media bridge may not reflect user preferences dictated by personal choices and may not meet purposes of a particular RTC instance. For example, the purpose of an RTC instance may include a cooperative design session focused on content sharing and real-time interaction, a telehealth remote surgery operation where latency and reliability constraints are heightened, a meeting moved to mobile devices where audio may be preferred to video and/or sharing of content for battery consumption and data billing preferences, among other purposes of an RTC instance. Therefore, providing the user(s) with the ability to set object QoE metric constraints may help the user(s) to increase their experience with the RTC system. The decisions enforced by the rate adaptation and transport logic of the media bridge may be enforced when the network is unable to handle the data transmission requirements for the RTC instance. This may result in the media bridge dropping one or more features of the RTC system in order to maintain communication between the client devices coupled to the media bridge.

The present systems and methods provide for packet loss and delay of real-time media flows to be monitored for numerous management reasons such as to identify a user's quality of experience (QoE). The real-time protocol (RTP) supports robust flow monitoring techniques. Accordingly, when an RTP flow passes through a network device such as a client device, the quality of the RTP flow at that network device may be monitored for outputting application layer QoE metrics that include bitrate (e.g., resolution), frames per second (e.g., smoothness), loss recovery and concealment (e.g., reliability), loss, jitter, and latency information, among other QoE metrics. A management device such as a media bridge may aggregate the QoE metrics output by network devices such as client devices within the RTC-based network. The aggregated information may be used for RTC service monitoring and QoE customization and prioritization for dynamic application within an RTC instance.

The present systems and methods a client device may express priorities among different available media streams as to prioritization of user-interface layout elements including participating client devices, and audio, video, and content sharing media streams associated with a given client device. Further, the present systems and methods a client device may express priorities among different available media streams as to prioritization of resolution, smoothness, and reliability of media streams using QoE metric selections to address specific purposes of the RTC instance and the client device (e.g., user) preferences. In the examples described herein, the client devices do not select a specific bitrate or resolution, but express these priorities among the different available media streams. In this manner, the client devices are always able to obtain the best video available if the network allows for the transport of it.

The degradation processes described in connection with the present systems and methods may begin only if necessary, and the decision to begin degradation is made and executed by the media bridge according to the priorities (e.g., preferences) set by the client device. In particular, the media bridge may begin to degrade the media streams starting with a lowest ranking media stream, and reducing the bitrate, the frame rate, and/or the protection associated to the media stream according to the QoE priorities (e.g., preferences) set by the client device. Further, the client device does not select specific QoE values to be associated with a media stream, but, instead, defines preferences based on QoE metrics, prioritizing one media stream over the other, or one QoE metric of a media stream over the other QoE metrics. For example, a client device may prioritize smoothness of a particular media stream over that particular media stream's resolution, and/or may prioritize the reliability of a media stream over other media streams, among other prioritizations.

The real-time transport protocol (RTP) control protocol (RTCP) packets described herein utilize a standard header that is compliant with RFC 4585 which is incorporated herein by reference. RTCP packets further include an synchronization source identifier (SSRC) of a media stream source field that is set to "0" because the described packet carries information about multiple media stream sources. Thus, while in RFC 4585, the definition of the field is "the synchronization source identifier of the media source that this piece of feedback information is related to," The packet payload (that starts at, for example, byte 13) is designed to transport information that supports the present systems and methods.

Overview

Examples described herein provide a method including, at a media bridge configured to distribute a plurality of media streams among a plurality of client devices connected to the media bridge over a network during a real-time communication (RTC) instance, receiving a plurality of quality of experience (QoE) preferences from the plurality of client devices via the media bridge, the plurality of QoE preferences being transmitted as a real-time transport protocol (RTP) control protocol (RTCP) extension header of a transmitted data packet. The method also includes receiving a plurality of QoE metrics at the media bridge, and in response to a determination that a degradation in network conditions of the network has occurred, downgrading at least one of the plurality of media streams based on the plurality of QoE preferences.

The method further includes sending a query to the plurality of client devices. The query requests the plurality of QoE preferences from the plurality of client devices. Receiving the plurality of QoE preferences from the plurality of client devices may occur at a commencement of the RTC instance, when a one of the plurality of client devices connects to the media bridge, when the network conditions degrade, when a degradation in QoE is expected, and combinations thereof.

The QoE preferences are defined by a number of QoE types. The QoE types include a resolution of at least one of the plurality of the media streams, a smoothness of at least one of the plurality of the media streams, and a reliability of at least one of the plurality of the media streams. The RTCP extension embeds information of the plurality of QoE preferences in a form of a ranking prioritization of the plurality of QoE metrics.

Downgrading the at least one of the plurality of media streams based on the plurality of QoE preferences includes downgrading the at least one of the plurality of media streams dynamically during transmission of the plurality of media streams. The plurality of QoE preferences define a prioritization of a first media stream over a remainder of the plurality of media streams. The plurality of QoE preferences define, for a first media stream of the plurality of media streams, a prioritization of a first QoE metric associated with the first media stream over a remainder of the plurality of QoE metrics associated with the first media stream.

Examples described herein also provide a media bridge including one or more processors, and one or more non-transitory computer-readable media storing instructions that, when executed by the one or more processors, cause the one or more processors to perform operations including receiving a plurality of quality of experience (QoE) preferences from the plurality of client devices via the media bridge, the plurality of QoE preferences being transmitted as a real-time transport protocol (RTP) control protocol (RTCP) extension of a transmitted data packet. The operations further include receiving a plurality of QoE metrics at the media bridge, and, in response to a determination that a degradation in network conditions of the network has occurred, downgrading at least one of a plurality of media streams produced by a plurality of client devices based on the QoE preferences.

The operations further comprising sending a query to the plurality of client devices, the query requesting the QoE preferences from the plurality of client devices. Receiving the plurality of QoE preferences from the plurality of client devices may occur at a commencement of an RTC instance, when a one of the plurality of client devices connects to the media bridge, when the network conditions degrade, when a degradation in QoE is expected, and combinations thereof.

The QoE preferences are defined by a number of QoE types. The QoE types including a resolution of at least one of the plurality of the media streams, a smoothness of at least one of the plurality of the plurality of media streams, and a reliability of at least one of the plurality of the media streams.

The RTCP extension embeds information of the QoE preferences in a form of a ranking prioritization of the plurality of QoE metrics. Downgrading the at least one of the plurality of media streams based on the QoE preferences includes downgrading the at least one of the plurality of media streams dynamically during transmission of the plurality of media streams. The QoE preferences define a prioritization of a first media stream over a remainder of the plurality of media streams. The QoE preferences define, for a first media stream of the plurality of media streams, a prioritization of a first QoE metric associated with the first media stream over a remainder of the plurality of QoE metrics associated with the first media stream.

Examples described herein also provide a non-transitory computer-readable medium storing instructions that, when executed, causes a processor to perform operations, including receiving a plurality of quality of experience (QoE) preferences from a plurality of client devices via a media bridge. The plurality of QoE preferences being transmitted as a real-time transport protocol (RTP) control protocol (RTCP) extension of a transmitted data packet associated with a real-time communication (RTC) instance. The operations further include receiving a plurality of QoE metrics at the media bridge, and in response to a determination that a degradation in network conditions of the network has occurred, downgrading at least one of the plurality of media streams based on the plurality of QoE preferences.

The operations further comprising sending a query to the plurality of client devices, the query requesting the plurality of QoE preferences from the plurality of client devices. The plurality of QoE preferences are defined by a number of QoE types, the QoE types including a resolution of at least one of the plurality of the media streams, a smoothness of at least one of the plurality of the media streams, and a reliability of at least one of the plurality of the media streams. The plurality of QoE preferences define a prioritization of a first media stream over a remainder of the plurality of media streams, for a first media stream of the plurality of media streams, a prioritization of a first QoE metric associated with the first media stream over a remainder of the plurality of QoE metrics associated with the first media stream, and combinations thereof.

As used in the present specification and in the appended claims, the terms "bridge," "media bridge," or "network bridge" are meant to be understood broadly as any computer networking device that creates a single, aggregate network from multiple communication networks or network segments. Thus, the function of a network bridge may be referred to as network bridging. In contrast to "routing" where multiple networks communicate independently and yet remain separate, network bridging connects two separate networks as if they were a single network. In terms of the open systems interconnection (OSI) model model), bridging may be performed in the data link layer (e.g., layer 2). The examples of network bridges described herein may include, for example, a multiport bridge among other types of bridges. The network bridge may be any computing device that is operable with executable code associated with a real-time communication (RTC), and is compatible with information-centric networking (ICN) and/or hybrid ICN network infrastructures. Although ICN and/or hICN network infrastructures are provided as examples described herein with, the present systems and methods may be applicable in any RTC networks, systems, and methods.

As used in the present specification and in the appended claims, the term "real-time communication (RTC)" or "WebRTC" is meant to be understood broadly as any system or methods that provides web browsers and mobile applications with real-time communication (RTC) via application programming interfaces (APIs). RTC allows audio and video communication to work inside web pages by allowing direct peer-to-peer communication, eliminating the need to install plugins or download native applications.

As used in the present specification and in the appended claims, the term "information-centric networking (ICN)" is meant to be understood broadly as any network architecture in which the focus is information, content, or data identified within the network. Content within an ICN network is accessed by name and caching is universal in the network. ICN natively supports multi access processing and anycast, multicast, and broadcast group communication processing.

Although the present systems and methods may be describe in the context of RTC and ICN/hICN systems and techniques, the present systems and methods may not utilize the specifics related to ICN/hICN, and, instead, the present systems and methods may be be applied to any type of network including RTC networks, and may utilize RTCP packets as described herein.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of a real-time communication (RTC) system 100, according to an example of the principles described herein. Real-time communication (RTC) software may be executed on the RTC system 100 to provide a plurality of client devices with the ability to communicate (e.g., exchange data packets) instantly or with negligible latency or transmission delays. The term "real-time" as used in the present description is synonymous with "live."

In one example, the RTC software utilized within and by the elements of the RTC system 100 may include Web Real-Time Communication (WebRTC). WebRTC provides web browsers and mobile applications with RTC capabilities via simple application programming interfaces (APIs). Further, WebRTC allows for audio and video communication to be transmitted inside web pages by allowing direct peer-to-peer communication without a requirement for a plugins or native application to be downloaded and/or installed. Standards for WebRTC may be defined by the World Wide Web Consortium (W3C) and the Internet Engineering Task Force (IETF). In one example, the RTC software may include Webex® web conferencing and videoconferencing applications developed and distributed by Cisco Systems, Inc. Further, in one example, the RTC software may include the Jitsi multiplatform voice (VoIP), video conferencing and instant messaging applications developed and distributed as open source software. Still further, in one example, the RTC software may include Microsoft® Teams® communication platform developed and distributed by Microsoft Corporation. Further, in one example, the RTC software may include Zoom® videoconferencing application developed and distributed by Zoom Video Communications, Inc. Any ICN-based RTC, hICN-based RTC, proprietary, and/or WebRTC systems may be used in connection with the present systems and methods. The examples described herein may be referred to as RTC systems and/or services, and an instance thereof may be referred to as an RTC instance. Further, in examples described herein, the RTC system 100 may include an ICN- or hICN-based network. A hybrid information-centric network (hICN) may include any ICN network architecture that utilizes Internet protocol version 6 (IPv6) or Internet protocol version 4 (IPv4) to realize location-independent communications. An hICN network may include a network stack that implements ICN forwarding path in IPv6, and a transport stack that implements transport protocols to provide a reliable transport service implementation and a real-time transport service for audio and/or video media.

A media bridge 102 is included within the RTC system 100. The media bridge 102 may include any suitable combination and arrangement of hardware and/or software, including any appropriate controlling logic, that can facilitate communication of information between multiple client devices 104-1, 104-2, 104-3, 104-4, . . . , 104-N (collectively referred to herein as client device(s) 104), where N is any integer greater than or equal to 1. Although five client devices 104 are depicted within the RTC system 100 of FIG. 1, any number of client devices 104 may be communicatively coupled to the media bridge 102.

In one example, the media bridge 102 may include and/or be computationally supported by any number of computing devices. These supporting computing devices may be part of, include, and/or may be intermediary to the media bridge 102 and other devices such as the client devices 104. Therefore, the media bridge 102 may include and/or be computationally supported by computing devices such as, for example, a server computing device (e.g., a number of privately-host servers, a number of enterprise-hosted servers, a cloud network of servers, etc.), a gateway computing device, a network switch, a router, web services, and cloud computing services, among other types of computing devices.

A number of client devices 104 may communicatively couple to the media bridge 102. Each client device 104 may have installed thereon RTC services and associated hardware and software to allow the client devices 104 to generate and transmit data packets defining a media stream, an instant message, and other types of real-time communications. In one example, the client devices 104 may generate and transmit data packets defining video and/or audio for dissemination by the media bridge 102 as an instance of a video conference. Although the examples provided herein are described in the context of a videoconference, any type of RTC and associated forms of communication may be used in and benefit from the systems and methods described herein.

As depicted in FIG. 1, and only as an illustrative example, client device 104-1, client device 104-2, client device 104-3, and client device 104-N are client devices 104 connected to the media bridge 102. Client device 104-4 may be a client device 104 seeking to connect to the media bridge 102 or establishing a connection with the media bridge 102. In these examples described herein, the client devices 104 act as producers in generating content (e.g., media streams sent from the client devices 104) to be made available via the media bridge 102 and subsequent dissemination to other client devices 104 as the client devices connect to and communicate with one another via the media bridge 102. The media bridge 102 acts as a consumer with respect to the media streams from the client devices 104 and can distribute the media streams to other client devices 104. Further, the client devices 104 acts as consumers of the media streams associated with other client devices 104. Each of the client devices 104 may send requests to the media bridge 102 for media streams transmitted by other client devices 104. The media bridge 102 is also a consumer with respect to the media streams of the client devices 104 participating within the RTC instance (e.g., the videoconference). Thus, in this manner, all client devices 104 may request media streams and/or content from any client device 104.

As described herein, the media bridge 102 queries for user input regarding QoE preferences (e.g., customization and/or prioritization preferences described herein). The client devices 104 transmitting and the media bridge 102 receives those QoE preferences. The media bridge 102 may apply those QoE preferences dynamically to an ongoing RTC instance in order to maintain a QoE for the client devices 104 (and the users of the client devices 104) as predicated by the QoE preferences. In this manner, the customization and optimization of QoE with regard to the user input and dynamically changing network conditions may result in higher subjective QoE over time for the RTC instance.

The client devices 104 and media bridge 102 utilize extended real-time transport protocol (RTP) control protocol (RTCP) packets in communicating QoE preference queries and responses. More specifically, the RTCP packets include RTCP extension headers to embed the information defining the QoE preferences from the client devices 104 in the form of ranking for the client devices and/or media streams prioritizations as well as coded QoE metric value preferences. In one example, the present systems and methods follow RFC 4585 to provide feedback to the client devices 104 and media bridge 102 and the RTCP packet is extended with a new transport layer feedback message.

Figure 2:
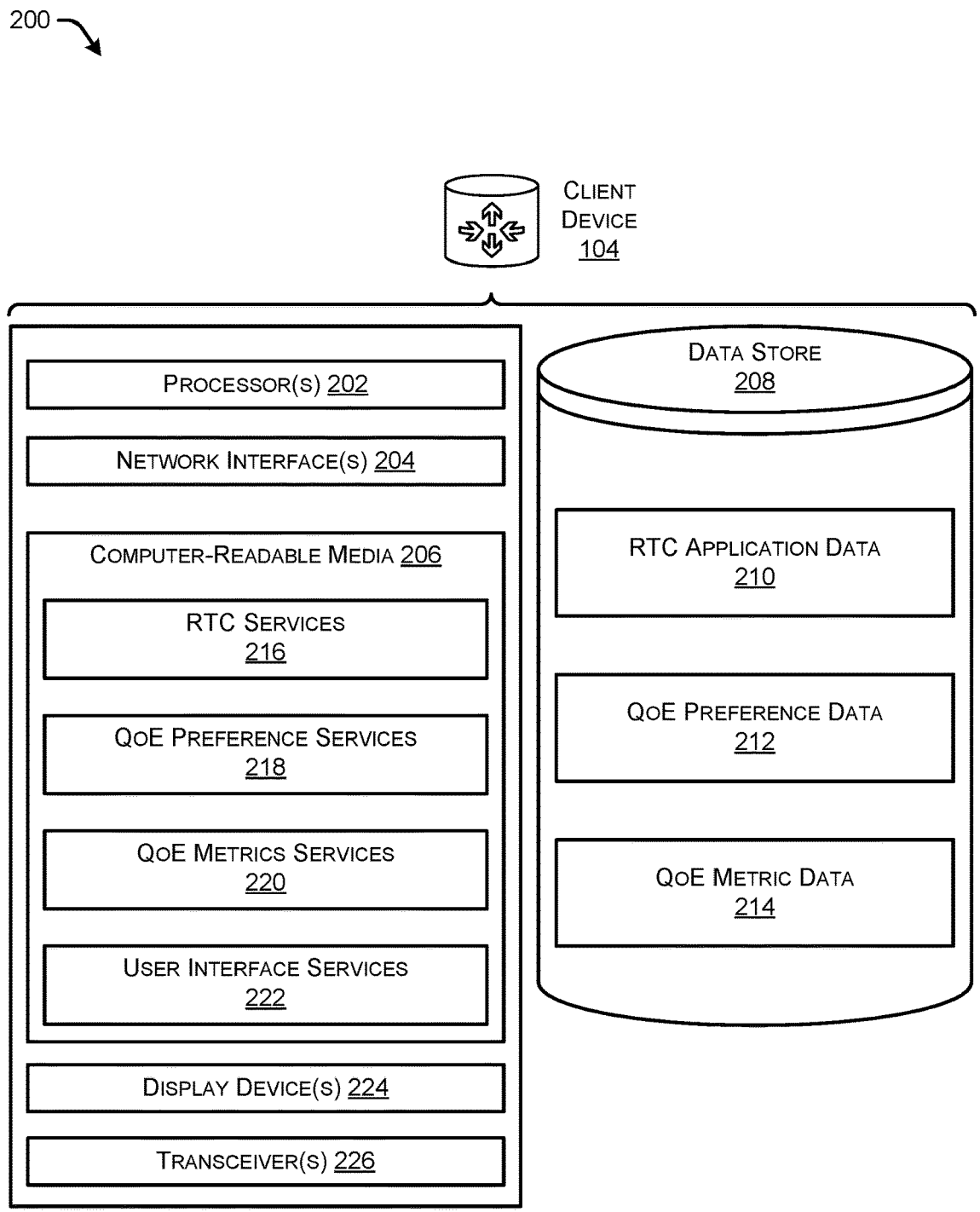
FIG. 2 is a component diagram of example components of a client device, according to an example of the principles described herein.

FIG. 2 is a component diagram 200 of example components of a client device 104, according to an example of the principles described herein. As illustrated, the client device 104 may include one or more processor(s) 202 configured to execute one or more stored instructions. The processor(s) 202 may comprise one or more cores. Further, the client device 104 may include one or more network interfaces 204 configured to provide communications between the client device 104 and other devices, such as devices associated with the system architecture of FIG. 1 including the media bridge 102, the other client devices 104, and/or other systems or devices associated with the client device 104 and/or remote from the client device 104. The network interfaces 204 may include devices configured to couple to personal area networks (PANs), wired and wireless local area networks (LANs), wired and wireless wide area networks (WANs), and so forth. For example, the network interfaces 204 may include devices compatible with the client devices 104, the media bridge 102, and/or other systems or devices associated with the client device 104.

The client device 104 may also include computer-readable media 206 that stores various executable components (e.g., software-based components, firmware-based components, etc.). In one example, the computer-readable media 206 may include, for example, working memory, random access memory (RAM), read only memory (ROM), and other forms of persistent, non-persistent, volatile, non-volatile, and other types of data storage. In addition to various components discussed herein, the computer-readable media 206 may further store components to implement functionality described herein. While not illustrated, the computer-readable media 206 may store one or more operating systems utilized to control the operation of the one or more devices that comprise the client device 104. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the client device 104 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems. The data store 208 may store, for example, RTC application data 210. The RTC application data 210 may include any data utilized by the client device 104 regarding the execution of the RTC services (e.g., applications) 216. This RTC application data 210 may include, for example, data relating to user preferences associated with the RTC services 216, the RTC services 216, and other data described herein that may assist in the real-time communication processes described herein. Further, the RTC application data 210 may include data relating to user preferences associated with the RTC services 216, passwords, usernames, key/value data, and other data that may be used by the RTC services 216 to sign on to the services provided by the RTC services 216, and other data described herein that may assist in the real-time communication processes described herein Further, the data store 208 may store QoE preference data 212. The QoE preference data 212 may include any data obtained through user input regarding prioritization of a media stream over a remainder of the plurality of media streams and prioritization of a QoE metric with regard to a media stream over a remainder of the plurality of QoE metrics associated with that media stream, and other prioritizations identified herein. The QoE preferences may be defined by a number of QoE types where the QoE types include, for example, a resolution of at least one of the plurality of the media streams, a smoothness of at least one of the plurality of the media streams, and a reliability of at least one of the plurality of the media streams. The QoE preference data 212 may be transmitted to the media bridge 102 by the client devices 104 at a commencement of the RTC instance, when a client device 104 connects to the media bridge 102, when the network conditions degrade, when a degradation in QoE is expected, and combinations thereof.

Further, the data store 208 may store QoE metric data 214. The QoE metric data 214 may include any data obtained through the functioning of the RTC system 100 including communications between the client devices 104 and the media bridge 102. As the systems and methods described herein operate, a number of metrics defining the quality of experience within the network and among the client devices 104 may be monitored. More specifically, the QoE metric data 214 may include any data obtained from monitoring a network device (e.g., the client devices 104 and/or the media bridge 102) that outputs application layer QoE metrics. The QoE metrics may include bitrate (e.g, resolution), frames per second (e.g., smoothness), loss recovery and concealment (e.g., reliability), loss, jitter, and latency information, among other QoE metrics. A management device such as the media bridge 102 may aggregate the QoE metrics output by network devices such as the client devices 104 within the RTC system 100. The aggregated information may be used for RTC service monitoring and QoE customization and prioritization for dynamic application within an RTC instance as described herein.

The computer-readable media 206 may store portions, or components, of RTC services 216. For example, the RTC services 216 of the computer-readable media 206 may include any applications or computer-readable and/or computer executable medium that provide real-time communications services to the client devices 104. The RTC services 216 may cause one or more real-time communications applications (e.g., WebRTC, Webex® online meeting service, Microsoft® Teams® communication platform, the Jitsi RTC software, or other videoconferencing or RTC applications) to, when executed by the processor(s) 202 present a media stream created by the client devices 104 to the media bridge 102 for dissemination to other client devices 104. The RTC services 216 allow for the client devices 104 to communicate with other client devices 104 and with and via the media bridge 102.

The computer-readable media 206 may store portions, or components, of QoE preference services 218. The QoE preference services 218 may provide for the querying and transmission of QoE preferences from the client devices 104 for use by the media bridge 102 for dynamic application of the QoE preferences to an RTC instance. The QoE preference services 218 may function in association with the user-interface (UI) services 222 of the client device 104 to allow any number of UIs to be presented on display device(s) 224 of the client devices 104 to allow a user to select priorities associated with the media streams and QoE metrics as described herein. Via the selection of QoE preferences, the client devices 104 may utilize the QoE preference services 218 to transmit their respective QoE preferences to the media bridge 102.

The computer-readable media 206 may store portions, or components, of QoE metric services 220. The QoE metric services 220 may provide for the monitoring, collection, and transmission of QoE metrics within the RTC system 100 and experienced by the client devices 104 and/or the media bridge 102. The QoE metrics obtained via the QoE metric services 220 may be used by the media bridge 102 for the triggering of dynamic application of the QoE preferences to an RTC instance.

The computer-readable media 206 may store portions, or components, of user interface services 222. The user interface services 222, when executed by the processor(s) 202 cause a UI to be displayed on a number of display device(s) 224 of the client device 104. In one example, the user interface services 222 cause the UI to be displayed on the display device(s) 224 and adjust the UI based on a query sent from the media bridge 102 requesting the QoE preferences. In one example, the UI displayed by the execution of the user interface services 222 by the processor(s) 202 may cause one or more UIs to be displayed on the display device(s) 224 that allow the user of the client device 104 to select prioritizations as described herein, and instruct the client device 104 to transmit those user selections to the media bridge 102 for application with an RTC instance.

The client device 104 may also include a number of display device(s) 224. The display device(s) 224 may be provided to allow a user of a client device 104 to interact with and implement the functionality of the RTC services 216, the QoE preference services 218, the QoE metrics services, the user interface services 222, and any other applications and services described herein. Examples of display devices 224 include a computer screen, a laptop screen, a mobile device screen, a personal digital assistant (PDA) screen, and a tablet screen, among other display devices 224.

The client device 104 may further include a transceiver 226. The transceiver 226 provides for communications with other data processing systems or devices such as, for example, the media bridge 102 and/or other client device(s) 104 communicatively coupled to the media bridge 102 and/or the client device 104. In one example, transceiver 226 includes one or more network interface cards. The transceiver 226 may provide communications through the use of either or both physical and wireless communications links.

Figure 3:
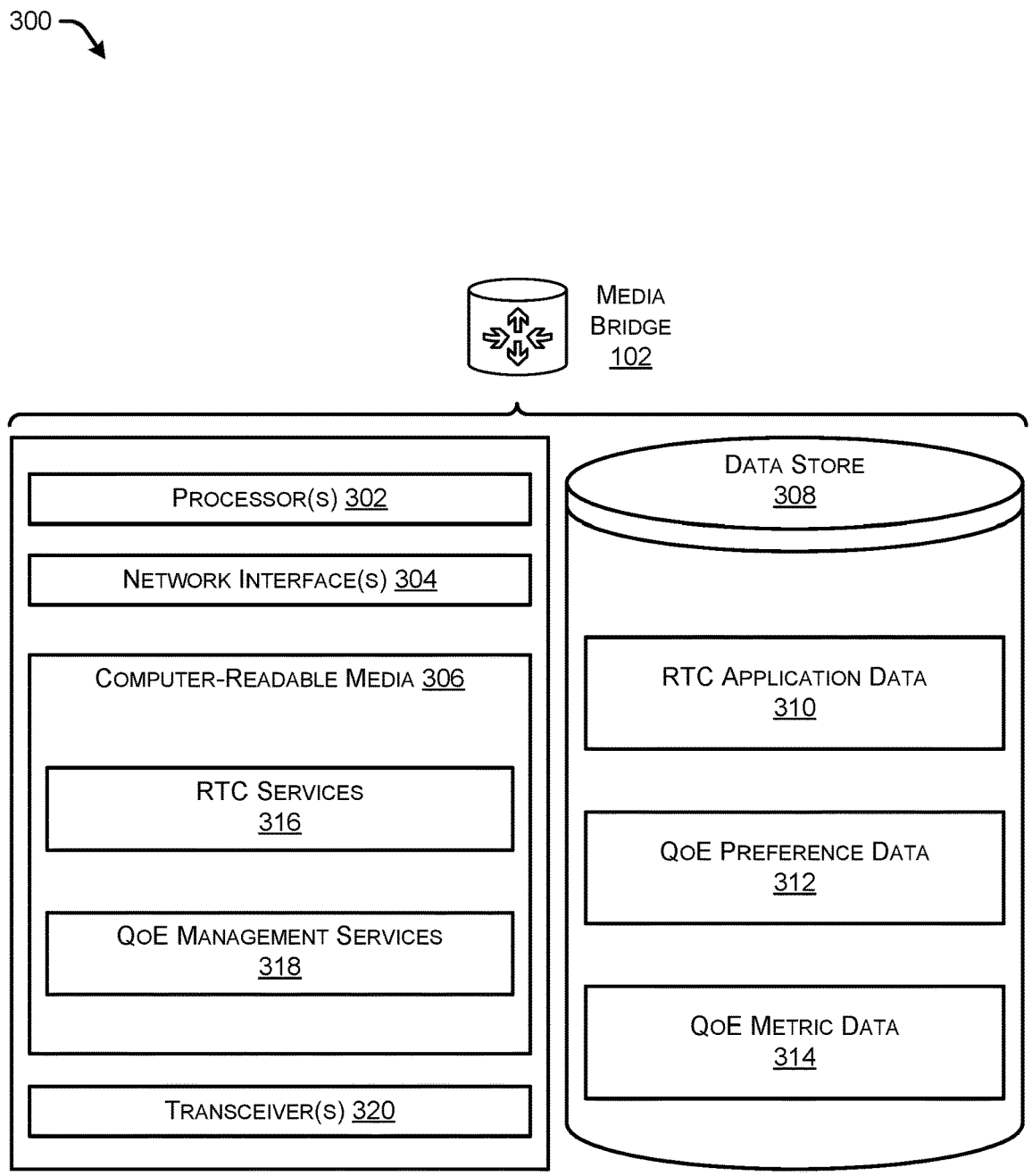
FIG. 3 is a component diagram of example components of a media bridge, according to an example of the principles described herein.

FIG. 3 is a component diagram 300 of example components of a media bridge 102, according to an example of the principles described herein. As illustrated, the media bridge 102 may include one or more processor(s) 302 configured to execute one or more stored instructions. The processor(s) 302 may comprise one or more cores. Further, the media bridge 102 may include one or more network interfaces 304 configured to provide communications between the media bridge 102 and other devices, such as devices associated with the system architecture of FIG. 1 including the client devices 104, and/or other systems or devices associated with the media bridge 102 and/or remote from the media bridge 102. The network interfaces 304 may include devices configured to couple to personal area networks (PANs), wired and wireless local area networks (LANs), wired and wireless wide area networks (WANs), and so forth. For example, the network interfaces 304 may include devices compatible with the client devices 104, the media bridge 102, and/or other systems or devices associated with the media bridge 102.

The media bridge 102 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the client device 104. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the media bridge 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, RTC application data 310. The RTC application data 310 may include any data utilized by the media bridge 102 regarding the execution of the RTC services (e.g., applications) 316. This RTC application data 310 may include, for example, data relating to user preferences associated with the RTC services 316, and other data described herein that may assist in the real-time communication processes described herein. Further, the RTC application data 310 may include data relating to user preferences associated with the RTC services 316, passwords, usernames, key/value data, and other data that may be used by the RTC services 316 to sign on to the services provided by the RTC services 316, and other data described herein that may assist in the real-time communication processes described herein.

Further, the data store 308 may store QoE preference data 312. The QoE preference data 312 may include any data obtained through user input regarding prioritization of a media stream over a remainder of the plurality of media streams and prioritization of a QoE metric with regard to a media stream over a remainder of the plurality of QoE metrics associated with that media stream, and other prioritizations identified herein. The QoE preferences may be defined by a number of QoE types where the QoE types include, for example, a resolution of at least one of the plurality of the media streams, a smoothness of at least one of the plurality of the media streams, and a reliability of at least one of the plurality of the media streams. The QoE preference data 312 may be transmitted to the media bridge 102 by the client devices 104 at a commencement of the RTC instance, when a client device 104 connects to the media bridge 102, when the network conditions degrade, when a degradation in QoE is expected, and combinations thereof.

Further, the data store 308 may store QoE metric data 314. The QoE metric data 314 may include any data obtained through the functioning of the RTC system 100 including communications between the client devices 104 and the media bridge 102. As the systems and methods described herein operate, a number of metrics defining the quality of experience within the network and among the client devices 104 may be monitored. More specifically, the QoE metric data 314 may include any data obtained from monitoring a network device (e.g., the client devices 104 and/or the media bridge 102) that outputs application layer QoE metrics. The QoE metrics may include bitrate (e.g, resolution), frames per second (e.g., smoothness), loss recovery and concealment (e.g., reliability), loss, jitter, and latency information, among other QoE metrics. A management device such as the media bridge 102 may aggregate the QoE metrics output by network devices such as the client devices 104 within the RTC system 100. The aggregated information may be used for RTC service monitoring and QoE customization and prioritization for dynamic application within an RTC instance as described herein.

The computer-readable media 306 may store portions, or components, of RTC services 316. For example, the RTC services 316 of the computer-readable media 306 may include any applications or computer-readable and/or computer executable medium that provide real-time communications services between the media bridge 102 and the client devices 104. The RTC services 316 may cause one or more real-time communications applications (e.g., WebRTC, Webex® online meeting service, Microsoft® Teams® communication platform, the Jitsi RTC software, or other videoconferencing or RTC applications) to, when executed by the processor(s) 302, present a media stream created by the client devices 104 to the media bridge 102 for dissemination to other client devices 104. The RTC services 316 allow for the client devices 104 to communicate with other client devices 104 and with and via the media bridge 102.

The computer-readable media 306 may store portions, or components, of QoE management services 318. The QoE management services 218 may provide for the querying and transmission of QoE preferences from the client devices 104 for use by the media bridge 102 for dynamic application of the QoE preferences to an RTC instance. Further, the QoE management services 318 may function to store any QoE preferences in the data store 308 as the QoE preference data 312 and utilize the preference data to trigger dynamic application of the QoE preferences to an RTC instance as described herein.

The client device 104 may further include a transceiver 320. The transceiver 320 provides for communications with other data processing systems or devices such as, for example, the client device(s) 104 communicatively coupled to the media bridge 102. In one example, transceiver 320 includes one or more network interface cards. The transceiver 320 may provide communications through the use of either or both physical and wireless communications links.

Figure 4:
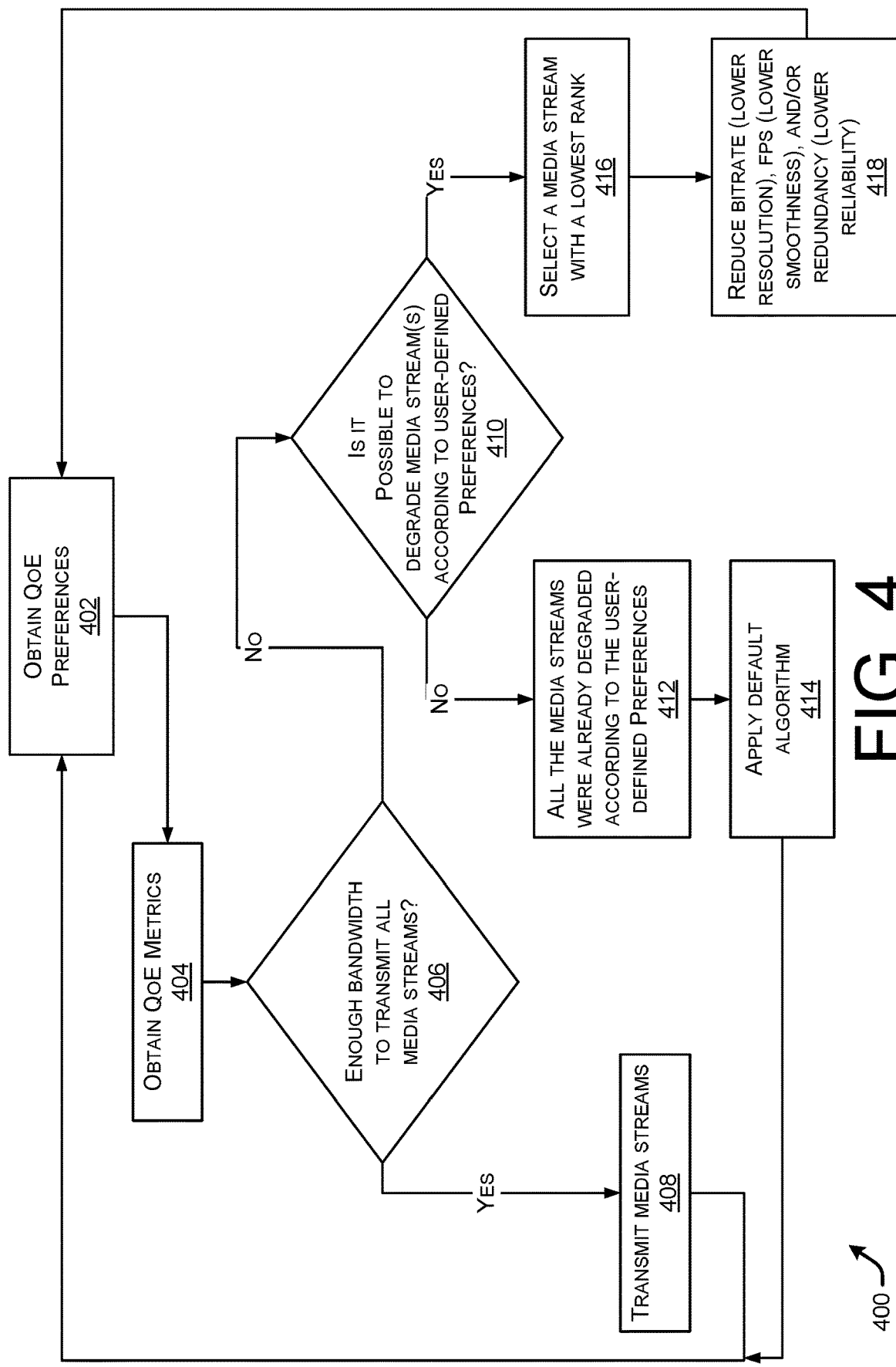
FIG. 4 illustrates a method of dynamically applying user-defined quality of experience (QoE) preferences within an RTC instance, according to an example of the principles described herein.

FIG. 4 illustrates a method 400 of dynamically applying user-defined quality of experience (QoE) preferences within an RTC instance, according to an example of the principles described herein. The method of FIG. 4 may include, at 402, obtaining QoE preferences from a number of the client devices 104 communicatively coupled to the media bridge 102. At 402, the media bridge 102 may be configured to distribute a plurality of media streams among a plurality of client devices 104 connected to the media bridge 102 over a network such as the network depicted in the RTC system 100 of FIG. 1. During an RTC instance, the media bridge 102 may receive a plurality of QoE preferences from the plurality of client devices 104 in response to a query from the media bridge 102. The plurality of QoE preferences may be transmitted as a real-time transport protocol (RTP) control protocol (RTCP) extension header of a transmitted data packet which is described herein in more detail in connection with FIG. 5.

The input from the client devices 104 may be requested by the media bridge 102 at any time before commencement of and/or during an RTC instance. In one example, the media bridge 102 may query the client devices 104 at the commencement of the RTC instance, when a client device is establishing a connection with the media bridge 102, when a client device 104 joins the RTC instance, when network conditions deteriorate and/or when QoE degradation is expected based on existing application-layer QoE monitoring such as, for example, estimated bandwidths, losses, or delay within the network. The media bridge 102 may query the client devices 104 at any combination of the above instances.

Further, at 404 of FIG. 4, a number of QoE metrics may be requested by and received at the media bridge 102. In one example, the QoE metrics may be referred to as objective QoE metrics as they provide an objective measure of user satisfaction, and may include, for example, resolution as related to bitrate (e.g., magabytes per second (MB/s)), smoothness as related to frame per second (FPS), and reliability as related to loss recovery and concealment. In one example, the QoE metrics may be applied either to a single audio/visual (A/V) content sharing media stream, or to an active speaker associated A/V content sharing media stream.

At 406, the media bridge 102 determines whether enough bandwidth within the network as included in the RTC system 100 of FIG. 1 to transmit all media streams produced by the client devices 104, consumed by the media bridge 102, and disseminated by the media bridge 102 to other client devices 104. Network bandwidth may be measured as a physical layer useful bit rate or a maximum throughput of a logical or physical communication path within the RTC instance. The QoE metrics obtained at 404 may be used by the media bridge 102 to determine whether the network bandwidth has degraded to a predetermined threshold. At 406, if the media bridge 102 determines that enough bandwidth is available within the network to transmit all the media streams from the client devices 104 (406, determination YES), then the media bridge 102 transmits all the media streams at 408. The method 400 may return to 402 for additional instances of processing in a looping manner.

If, instead, the media bridge 102 determines that there is not enough bandwidth available within the network to transmit all the media streams from the client devices 104 (406, determination NO), then a determination is made at 410 as to whether it is possible to degrade one or more media streams produced by the client devices 104 and disseminated by the media bridge 102. Degradation of the media streams may be based on the user-defined QoE preferences obtained at 402, and may include, for example, changes in prioritization of layout elements such as, for example, what media streams of the client devices 104 are displayed on a display device 224 within a UI, which media streams (e.g., audio, video, content sharing elements) associated with a given client device 104 are displayed, and whether one or more of he media streams displayed are prioritized for smoothness in the video over resolution of the video, among other prioritizations of layout elements defined by the QoE preferences obtained at 402. Further, degradation of the media streams may be based on the user-defined QoE preferences obtained at 402, and may include, for example, changes in prioritization of QoE metric selections according to the purpose of the meeting and/or the QoE preferences obtained at 402. As described herein, the QoE metric selections may include, for example, QoE metrics associated with the resolution, smoothness, and reliability of media streams. In this manner, the media bridge 102 receives the QoE preferences as input and the media bridge 102 makes decisions based on the distribution path from the media bridge 102 to a given client device 104 in terms of the quality selection, rate adaption, and loss recovery as defined by the QoE preferences of each of the media streams.

If the media bridge 102 determines that it is not possible to degrade one or more of the media streams produced by the client devices 104 (410, determination NO), it is determined at 412 that all the media streams have already been degraded according to the user-defined QoE preferences obtained at 402. At 414, the method 400 further includes applying a default algorithm to address the lack of bandwidth identified at 406. The default algorithm may be any algorithm that may reduce the bandwidth requirements within the RTC instance such as, for example, an algorithm that restricts the transmission of video of at least one media stream of a client device 104 at a level of quality and/or entirely, restricts audio of at least one media stream of a client device 104, stop transmission of at least one media stream of a client device 104 that is not a client device of an active speaker, other default restrictions, and combinations thereof. In this manner, the users of the client devices 104 are allowed to prioritize for their own preferences at 402 through 410, and, if more restrictions on bandwidth use are required, the media bridge 102 may make additional or further restrictions in order to maintain as much communication between the client devices 104 as possible. Once 414 is performed by the media bridge 102, the method may loop to 402, 404, and/or 406 for further determination of user preferences and bandwidth availability.

In one example, the process at 414 may not be included within the method. In this example, the RTC instance may simply not continue after all of the QoE preferences are applied in order to ensure that communication between the client devices 104 and/or the media bridge 102 does not degrade to a level that reduces the QoE for the users of the client devices 104. For example, if a level of bandwidth is not available sufficient for the users of the client devices 104 to understand one another within the RTC instance even after the QoE preferences are applied, the media bridge 102 may terminate the RTC instance and/or provide the client devices 104 with a notification indicating that insufficient bandwidth exists to support the RTC instance. In this manner, the RTC system 100 may ensure a minimum level of quality in the RTC instance that may reflect on a QoE of the users of the client devices 104.

If at 410, the media bridge 102 determines that it is possible to degrade one or more of the media streams produced by the client devices 104 (410, determination YES), then the media bridge 102 may select a media stream from a client device 104 with a lowest ranking. A lowest ranking media stream may include any identified media stream from any client device 104 that has been ranked as lowest among the other media streams from the other client devices. For example, a media stream produced by a client device 104 that has been identified by the other client devices 104 as being of a lowest ranking among other media streams may be designated as the lowest ranking media stream and associated client device 104. In one example, the lowest ranking media stream may include any media stream whose associated client device is not an active speaker (e.g., a non-active speaker), has been designated as only a viewer of the RTC instance and not allowed to comment, other ranking schemas, and combinations thereof.

At 418, the QoE preferences obtained at 402 are applied to the lowest ranking media stream to reducing, for example, the bitrate (e.g., bitrate (e.g, resolution), frames per second (e.g., smoothness), and/or loss recovery and concealment (e.g., reliability) of the media stream. In one example, the process of the method 400 at 416 and 418 may be performed to a plurality of media streams if necessary in order to obtain a reduction in bandwidth requirements to meet a current bandwidth availability within the RTC system 100 and the RTC instance. In this manner, the QoE preferences obtained at 402 may be applied dynamically during and throughout the RTC instance. The method 400 may also include looping back to 402 through 406 and 410 as indicated in FIG. 4 and as determined necessary by the media bridge 102 in order to obtain the ruction in bandwidth requirements to meet a current bandwidth availability within the RTC system 100 and the RTC instance.

In the manner described in connection with FIG. 4, The QoE preferences of a user or group of users participating in an RTC instance may be customized and optimized in a dynamic manner as network conditions change during the RTC instance. This results in higher subjective QoE considering the RTC instance over time, and the participants' experience in communicating in a most effective manner even in instances where network bandwidth is not at an optimal or nominal level. The QoE preferences may be defined based on the QoE metrics, prioritizing one flow over the other or one QoE metric obtained at 404 related to a flow over of other metrics such as, for example, prioritizing smoothness of a video component of a media stream over its resolution, or prioritizing the reliability of a media stream over the resolution or smoothness of the media stream.

Having described various examples of systems, devices, and methods of FIGS. 1 through 4, FIG. 5 illustrates a real-time transport protocol (RTP) control protocol (RTCP) packet 500 including an RTCP extension header 532 and a transport layer feedback message (consisting of, for example, 512 and 514), according to an example of the principles described herein. The RTCP packet 500 of FIG. 5 may include additional packet information not depicted in FIG. 5, may form part of a larger data packet sent from the client devices 104 to the media bridge 102, and/or may be included with other data packets. The systems, devices, and methods described herein leverage the use of RTCP extension headers to embed the information of the QoE preferences queried by the media bridge 102 and received from the client devices 104 at the media bridge such as indicated at 402 of FIG. 4. The QoE preferences may be presented in the form of ranking for the client device(s) 104 and/or media stream prioritization, and may also include a number of coded QoE metric values. As mentioned above, the RTCP packet 500 of FIG. 5 may be based on the RFC 4585 to provide feedback to the sender of the query (e.g., the media bridge 102), and includes an extended RTCP packet with the transport layer feedback message (e.g., 512 and 514).

The RTCP packet 500 of FIG. 5 may include an Internet Protocol (IP) header 502 for addressing and routing purposes. In one example, the IP header 502 may include information regarding an IP version, source IP address, destination IP address, and time-to-live, among other header information.

The RTCP packet 500 of FIG. 5 may also include a user datagram protocol (UDP) header 504. The UDP header 504 may provide integrity verification (e.g., via checksum) of the IP header 502 and any payload.

In one example, the RTCP packet 500 of FIG. 5 may also include a random prefix 506 in instances where the RTCP packet 500 is encrypted. If the RTCP packet 500 is to be encrypted, the RTCP packet 500 may be prefixed by a 32-bit random value and identified as the random prefix 506.

A version number 508 indicated as "V" in FIG. 5 may be included within the RTCP extension header 532 of the RTCP packet 500. The version number 508 may be nay 2 bit indicator, for example, that identifies the RTP version. The version number 508 may be 2 for the current version of real-time transport protocol (RTP). The version number 508 may be updated as new versions of RTP are introduced.

The RTCP extension header 532 of the RTCP packet 500 may also include padding 510 indicated as "P" in FIG. 5. A padding bit indicates that the RTCP packet 500 has been padded out beyond its natural size. If the padding 510 bit is set, one or more octets of padding have been added to the end of the RTCP packet 500, and the last octet includes a count of the number of padding octets added. In the example of FIG. 5, the padding 510 may be 1 bit long.

A feedback message type 512 indicated as FMT in FIG. 5 may also be included within the RTCP extension header 532 of the RTCP packet 500. The feedback message type 512 may be set to 2 as this designates that it is currently unused. In the example of FIG. 5, the feedback message type 512 may be 5 bits long.

Further, the RTCP extension header 532 of the RTCP packet 500 may include a packet type 514 designated as "PT" in FIG. 5. The packet type 514 may also be referred to as payload type. The packet type 514 identifies the type of information carried in the RTCP packet 500. The packet type 514 is 205 in the example of FIG. 5, indicating that the packet type is a transport layer feedback message. However, any number may be utilized to assist in the identification of a specific packet type; namely the present type of packet described in FIG. 5. In the example of FIG. 5, the packet type 514 may be 8 bits long.

The RTCP extension header 532 of the RTCP packet 500 may also include a length 516 designation. In one example, the length of the RTCP packet 500 may in 32-bit words minus one, including the header and any padding. This is in line with the definition of the length field used in RTCP sender and receiver reports. In the example of FIG. 5, the length 516 may be 16 bits long.

A synchronization source (SSRC) of the sender of the RTCP packet 500 may be identified at 518. An SSRC of the packet sender 518 may include a 32 bit identifier that uniquely identifies the sender of the RTCP packet 500 (e.g., the originator of the RTCP packet 500). The synchronization sources within the same RTP session may be unique. Thus, an SSRC identifier for a particular media stream from a client device 104 may be unique. In an example where the Webex® web conferencing and videoconferencing application is executed, the SSRC of the packet sender 518 may be set equal to the Capture Source ID (CSI) of the client device 104.

The RTCP extension header 532 of the RTCP packet 500 may also include an SSRC of the media source 520. The SSRC of media source maybe set to 0 as indicated in FIG. 5 since the RTCP packet 500 does not refer to a single media source but to a plurality of media sources in correlation with the number of client devices 104 participating in the RTC instance. An associated field defining the number of SSRCs 522 may also be included within the RTCP extension header 532 of the RTCP packet 500. The number of SSRCs 522 indicates how may SSRCs (524 described below) are listed in the RTCP packet 500. Each SSRC refers to a media stream (e.g., audio, video, and/or content sharing) that is received by the media bridge 102. A number of SSRCs 524-1, 524-2, . . . , 524-M (collectively referred to herein as SSRC(s) 524), where M is any integer greater than or equal to 1, may be presented in the RTCP extension header 532 of the RTCP packet 500. Again, the number of SSRCs 522 indicates how may SSRCs 524 are listed in the RTCP packet 500. In the example of FIG. 5, the number of SSRCs 522 may be set to "m" since there are M number of SSRCs 524 included in the RTCP extension header 532 of the RTCP packet 500.

The order of the SSRCs 524 presented in the RTCP extension header 532 of the RTCP packet 500 indicates the priority of each media stream as produced by the respective client devices 104. For example, SSRC 524-1 may be the most prioritized for media stream since, for example, it is a media stream produced by a client device 104 that is used by a manager of the RTC instance or is a media stream associated with a client device 104 that is being used by an active speaker within the RTC instance. The prioritization of the SSRC 524-1 may be based on any parameter described herein including the prioritization indicated by the users of the client devices 104 participating in the RTC instance. As described herein, the media bridge 102 may query the client devices 104 to determine prioritizations as to the media streams of the client devices 104 as well as to which of a number of QoE metrics to prioritize for.

SSRC 524-2 may be identified as a second-most prioritized for media stream for any reason described herein and/or as designated by the users of the client devices 104. In a similar manner, the SSRCs 524 may be listed in order within the RTCP extension header 532 of the RTCP packet 500 based on prioritizations assigned to the respective media streams of the client devices 104 and ending with SSRC 524-*m* being the last prioritized for media stream.

The RTCP extension header 532 of the RTCP packet 500 may also include a number of QoE types 526-1, 526-2, . . . 526-T (collectively referred to herein as QoE type(s) 526), where T is any integer greater than or equal to 1. One QoE type 526 is associated with each SSRC 524 in the list of SSRCs 524. The QoE type 526 represents which QoE metrics the individual client devices 104 participating in the RTC instance wants to sacrifice to accommodate and prioritize for when any deteriorating network conditions occur. In one example, a QoE type 526 may include a bit array of 8 bits as where three bits are utilized as indicated at 534. The QoE types 526 may include, for example, R which indicates the resolutions, S which indicates the smoothness, and L (referring to losses) which indicates the reliability of the media streams produced by the client devices 104 participating in the RTC instance. A client device 104 may set one or more of these bits. If a bit is set, the media bridge 102 may make decisions regarding the corresponding QoE metric for the particular media stream the QoE metric is associated with. In one example, an indication that the bit for QoE type 526-1 is set to "1" indicates that the media bridge 102 may degrade the media stream associated with that QoE type 526-1 whereas a bit set to "0" indicates to the media bridge 102 that the media stream associated with that QoE type 526-1 may not be degraded. For example, if for media stream identified by SSRC 524-M both R (resolution) and S (smoothness) are set to "1," the media bridge 102 may reduce both the video quality and the frames per second for that media stream. Thus, at 406 and 410 where at least one media stream is degraded based on the QoE preferences, the media bridge 102 may reduce the quality/smoothness/reliability of a media stream. In the examples described herein, the media bridge 102 may begin from the least prioritized for SSRC 524 (e.g., SSRC 524-M) and proceed backwards up the list of SSRCs 524 to the most prioritized for SSRC 524 (e.g., SSRC 524-1). This ensures that the most prioritized for media streams are not degraded unnecessarily until a sufficient loss in bandwidth justifies the degradation of the most prioritized for media streams.

The manner in which the SSRCs 524 and QoE types 526 are set may be based on the prioritization the users of the client devices 104 place in their respective media streams and the purpose of the RTC instance. For example, if the RTC instance includes a videoconference in the which users are simply conversing and video and/or content sharing is not critical, the users may, upon being queried by the media bridge 102, indicate that the audio of the RTC instance is to be prioritized by selecting for one or more media streams and prioritizing the QoE types 526 as prioritized parameters.

The RTCP extension header 532 of the RTCP packet 500 may also include padding 530. Like the padding 532 described above, a padding bit indicates that the RTCP packet 500 has been padded out beyond its natural size. If the padding 532 bit is set to, for example, "1," one or more octets of padding have been added to the end of the RTCP packet 500, and the last octet includes a count of the number of padding octets added. In the example of FIG. 5, the padding 532 may be 1 bit long.

Once received at the media bridge 102, the QoE input obtained from the client devices 104 via the RTCP extension header 532 of the RTCP packet 500 may be considered in the distribution path from the media bridge 102 to a given client device 104 in terms of prioritization and selection of media streams, prioritization and selection of quality, rate adaptation, and loss recovery (e.g., retransmissions and FEC processing). Based on the information included within the RTCP packets 500 received from the client devices 104, the media bridge 102 processes the media streams according to the method described in connection with FIG. 4.

The RTCP packet 500 may be sent by the client devices before the RTC instance begins, at the time of establishment of a connection by a client device 104 to the media bridge 102, during the RTC instance, or any other period in time when QoE preferences may be obtained from the client devices 104.

As an example of FIGS. 4 and 5*a* hearing impaired individual may prefer to ensure the highest video quality at the expense of any audio associated with the media stream in order to prioritize for a sign language translator displayed on a media stream received at a client device 104 utilized by the hearing impaired individual. In this example, the hearing impaired individual may, when queried, supply the media bridge 102 with preferences to prioritize for, for example, the video portion of the including bitrate (e.g, resolution), frames per second (e.g., smoothness), loss recovery and concealment (e.g., reliability), etc. In contrast, a visually impaired individual may prefer the best audio available form the media stream(s). In this example, the visually impaired individual may, when queried, supply the media bridge 102 with preferences to prioritize for, for example, the audio portion of the including bitrate (e.g., resolution), frames per second (e.g., smoothness), loss recovery and concealment (e.g., reliability), etc. These preferences may be submitted by a client device 104 to the media bridge 102 to address a specific media stream among a number of media streams produced by the client devices 104 and obtained by the media bridge 102.

Figure 6:
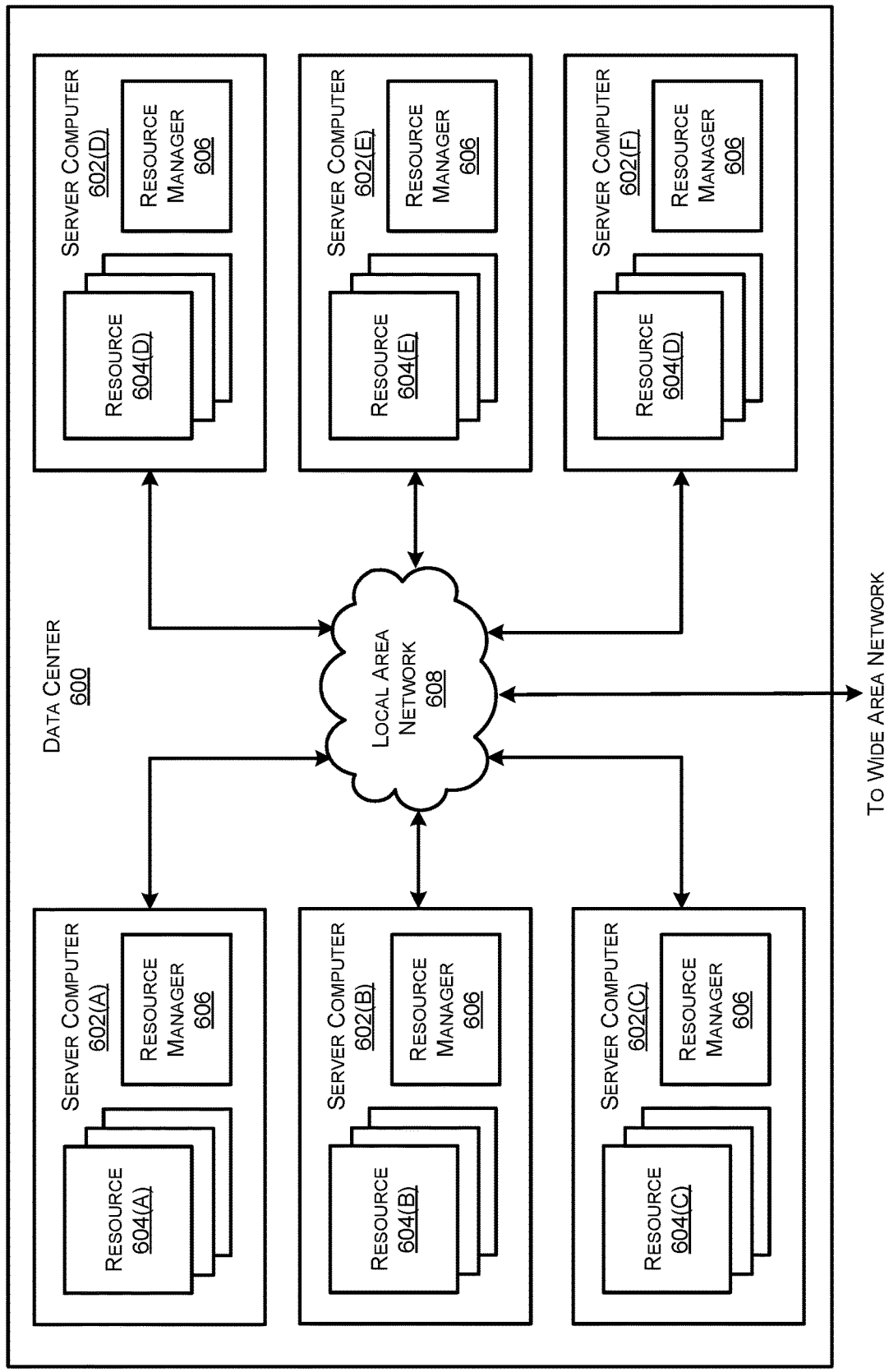
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
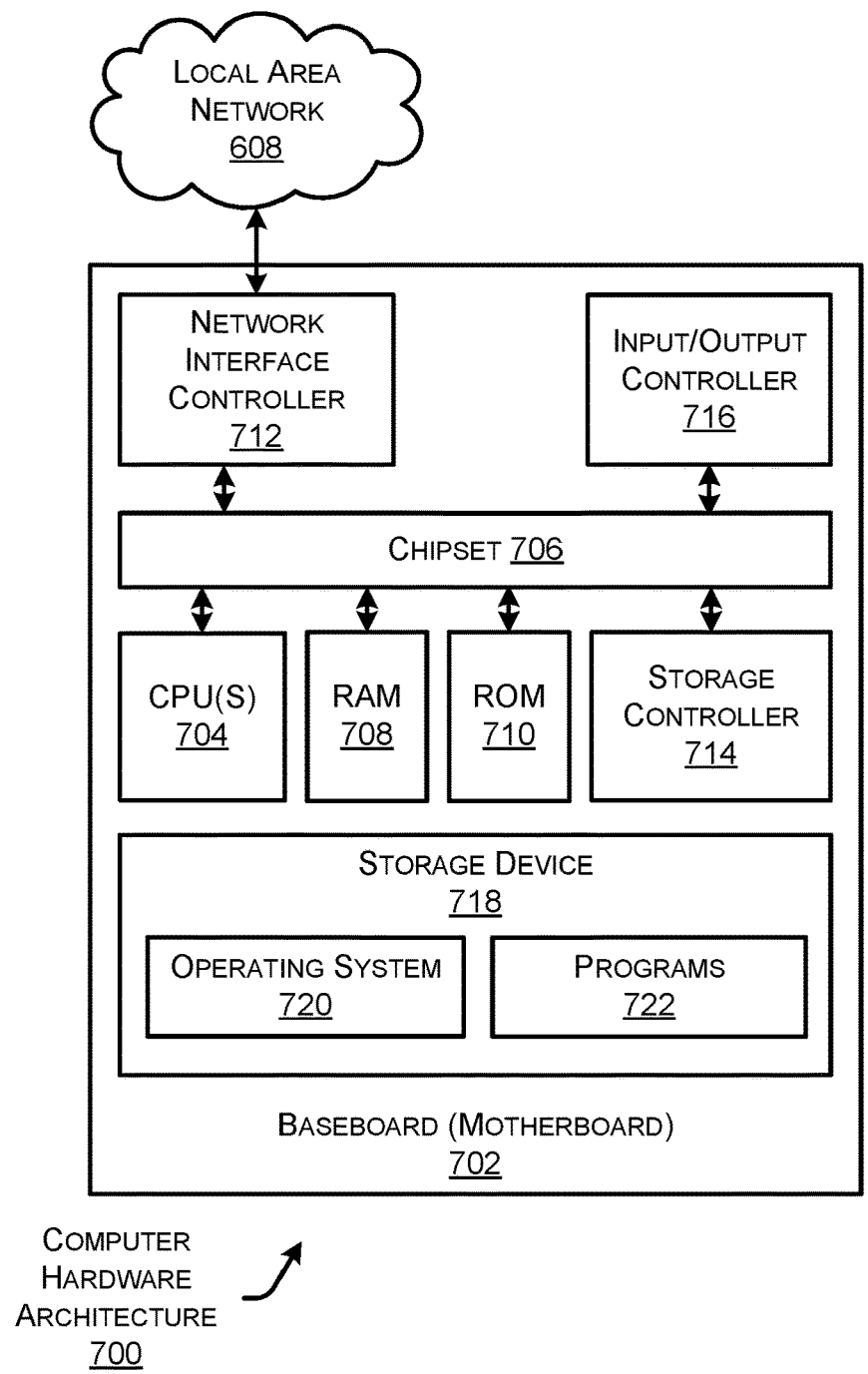
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the media bridge 102, the client devices 104, and/or other systems or devices associated with the media bridge 102 or client devices 104 and/or remote from the media bridge 102 or client devices 104, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., media bridge 102, the client devices 104 (and associated devices)) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network including the media bridge 102 and the client devices 104, among other devices. The chipset 706 may include functionality for providing network connectivity through a Network Interface Controller (NIC) 712, such as a gigabit Ethernet adapter. The NIC 712 is capable of connecting the computer 700 to other computing devices within the media bridge 102 and/or the client devices 104 and external to the media bridge 102 and/or the client devices 104. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the media bridge 102, the client devices 104, and/or any components included therein, may be supported by one or more devices similar to computer 700. Stated otherwise, some or all of the operations performed by the media bridge 102, the client devices 104, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 5. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the the media bridge 102, the client devices 104, and/or other systems or devices associated with the media bridge 102 or client devices 104 and/or remote from the media bridge 102 or client devices 104. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the media bridge 102, the client devices 104, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 722 may comprise any type of programs or processes to perform the techniques described in this disclosure for the media bridge 102 and/or the client devices 104 as described herein. The programs 722 may enable the devices described herein to perform various operations.

CONCLUSION

The examples described herein provide a mechanism for gathering user inputs on QoE customization and/or prioritization, signaling to the media bridge, and applying the QoE preferences dynamically to the ongoing RTC instance. The methods and systems include defining preferences based on the QoE metrics, prioritizing one media stream over the other or one QoE metric related to a media flow over other QoE metrics. For example, the systems and methods described herein may be used to prioritize smoothness of a media stream over the resolution of the or prioritizing the reliability of a media stream over another parameter of the media stream. The present systems and methods also include determining when the QoE input from the client devices is received by the media bridge, an associated RTCP packet, and how the QoE preferences are signaled and applied by the media bridge. The QoE preferences may be gathered as input from the from the user at the commencement of an RTC instance, when a client device 104 joins the RTC instance, anytime during the RTC instance, or at any other time. Further, the input may be gathered by the media bridge from the client devices 104 when network conditions deteriorate and a QoE degradation is expected, based on existing application-layer QoE metric monitoring such as, for example, estimated bandwidth, losses, delay or other QoE metrics. The media bridge may query users of the client devices to express one or more inputs based on their respective prioritization of layout elements like media streams and audio, video, and/or sharing media streams associated to a given client device. The QoS preferences selection may be made according to the meeting purpose and/or individual preferences, and the QoE parameters may include, for example, resolution, smoothness, and reliability.

The systems and methods also include leveraging the use of real-time transport protocol (RTP) control protocol (RTCP) extension headers to embed the information of the QoE preferences in the form of ranking for the client device and/or media stream prioritization and of a coded QoE metric value. Feedback is provided to the client devices, and extend the RTCP packet with a new transport layer feedback message.

The systems and methods also include receiving the QoE preferences at the media bridge, and the media bridge makes decisions based on the distribution path from the media bridge to the given client device in terms of the media stream's selection, quality selection, rate adaption and loss recovery. The systems and methods also include customization and optimization of QoE preferences with regards to user input and dynamic network conditions that results in higher subjective QoE considering the RTC instance over time.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
   establishing a real-time communication (RTC) session between a first client device and a second client device connected over one or more networks;
   causing presentation of a user interface element on a display of the first client device, the user interface element configured to receive input indicating a quality of experience (QoE) preference of a user of the first client device;
   receiving user input provided via the user interface element indicating the QOE preference of the user, the QoE preference indicating a priority of the user that performance of a particular application-layer metric of the RTC session is optimized; and
   adjusting a network characteristic of the RTC session based at least in part on the QoE preference such that performance of the particular application-layer metric of the RTC session is optimized.

2. The method of claim 1, wherein the user interface element is presented at one or more of a first time associated with at least one of establishment of the RTC session, a second time associated with a third client device connecting to the RTC session, a third time associated with determining that network conditions degraded, or a fourth time associated with a degradation in QoE being expected.

3. The method of claim 1, wherein the QoE preference is at least one a resolution of a media stream of the RTC session, a smoothness of the media stream, or a reliability of the media stream.

4. The method of claim 1, wherein the user input indicates a plurality of QoE preferences that define ranking of different application-layer metrics of the RTC session that are to be prioritized.

5. The method of claim 1, wherein adjusting the network characteristic of the RTC session includes adjusting a media stream dynamically during transmission of the media stream.

6. The method of claim 1, wherein:
the first client device has established a plurality of media streams with other client devices; and
the QoE preference indicates that performance of a particular media stream of the plurality of media streams is to be prioritized over performances of other media streams of the plurality of media streams.

7. The method of claim 1, further comprising sending the QoE preference from the first client device and to the second client device.

8. A system comprising:
one or more processors; and
one or more non-transitory computer-readable media storing computer-executable instructions that, when executed by the one or more processors, cause the one or more processors to perform operations comprising:
establishing a real-time communication (RTC) session between a first client device and a second client device connected over one or more networks;
causing presentation of a user interface element on a display of the first client device, the user interface element configured to receive input indicating a quality of experience (QoE) preference of a user of the first client device;
receiving user input provided via the user interface element indicating the QOE preference of the user, the QoE preference indicating a priority of the user that performance of a particular application-layer metric of the RTC session is optimized; and
optimizing performance of the particular application-layer metric of the RTC session based at least in part on the QoE preference.

9. The system of claim 8, wherein the user interface element is presented at one or more of a first time associated with at least one of establishment of the RTC session, a second time associated with a third client device connecting to the RTC session, a third time associated with determining that network conditions degraded, or a fourth time associated with a degradation in QoE being expected.

10. The system of claim 8, wherein the QoE preference is at least one a resolution of a media stream of the RTC session, a smoothness of the media stream, or a reliability of the media stream.

11. The system of claim 8, wherein the user input indicates a plurality of QoE preferences that define ranking of different application-layer metrics of the RTC session that are to be prioritized.

12. The system of claim 8, the operations further comprising:
determining that performance of a network characteristic of the RTC session has degraded,
wherein optimizing the performance of the particular application-layer metric of the RTC session is performed in response to determining that the performance has degraded.

13. The system of claim 8, wherein:
the first client device has established a plurality of media streams with other client devices; and
the QoE preference indicates that performance of a particular media stream of the plurality of media streams is to be prioritized over performances of other media streams of the plurality of media streams.

14. The system of claim 8, the operations further comprising sending the QoE preference from the first client device and to the second client device.

15. A method comprising:
establishing a real-time communication (RTC) session between a first client device and a second client device connected over one or more networks;
causing presentation of a user interface element on a display of the first client device, the user interface element configured to receive input indicating a quality of experience (QoE) preference of a user of the first client device;
receiving user input provided via the user interface element indicating the QOE preference of the user, the QoE preference indicating a priority of the user that performance of a particular application-layer metric of the RTC session is optimized; and
adjusting a network characteristic of the RTC session based at least in part on the QoE preference such that performance of the particular application-layer metric of the RTC session is optimized.

16. The method of claim 15, wherein the user interface element is presented at one or more of a first time associated with at least one of establishment of the RTC session, a second time associated with a third client device connecting to the RTC session, a third time associated with determining that network conditions degraded, or a fourth time associated with a degradation in QoE being expected.

17. The method of claim 15, wherein:
the RTC session is used to communicate a video media stream between the first client device and the second client device; and
the QoE preference indicates a video media characteristic that is to be prioritized.

18. The method of claim 15, wherein the user input indicates a plurality of QoE preferences that define ranking of different application-layer metrics of the RTC session that are to be prioritized.

19. The method of claim 15, wherein adjusting the network characteristic of the RTC session includes adjusting a media stream dynamically during transmission of the media stream.

20. The method of claim 15, wherein:
the first client device has established a plurality of media streams with other client devices; and
the QoE preference indicates that performance of a particular media stream of the plurality of media streams is to be prioritized over performances of other media streams of the plurality of media streams.

* * * * *